(12) United States Patent
Morioka et al.

(10) Patent No.: US 10,914,236 B2
(45) Date of Patent: Feb. 9, 2021

(54) HEAT EXHAUST SYSTEM FOR ON-AIRCRAFT ELECTRIC GENERATOR

(71) Applicant: IHI Corporation, Koto-ku (JP)

(72) Inventors: Noriko Morioka, Tokyo (JP); Hitoshi Oyori, Tokyo (JP)

(73) Assignee: IHI Corporation, Koto-ku (JP)

( * ) Notice: Subject to any disclaimer, the term of this patent is extended or adjusted under 35 U.S.C. 154(b) by 139 days.

(21) Appl. No.: 16/176,370

(22) Filed: Oct. 31, 2018

(65) Prior Publication Data

US 2019/0063321 A1 Feb. 28, 2019

Related U.S. Application Data

(63) Continuation of application No. PCT/JP2017/005398, filed on Feb. 15, 2017.

(30) Foreign Application Priority Data

Sep. 1, 2016 (JP) ................. 2016-170772

(51) Int. Cl.
  *F02C 7/224* (2006.01)
  *F02C 7/32* (2006.01)
  *F02C 7/16* (2006.01)

(52) U.S. Cl.
  CPC ............. *F02C 7/224* (2013.01); *F02C 7/16* (2013.01); *F02C 7/32* (2013.01)

(58) Field of Classification Search
  CPC .... F02C 7/16; F02C 7/22; F02C 7/222; F02C 7/224; F02C 7/228; F02C 7/232; F02C 7/236; F02C 7/32; F05D 2260/213
  See application file for complete search history.

(56) References Cited

U.S. PATENT DOCUMENTS

| 4,696,156 A | 9/1987 | Burr et al. |
| 4,773,212 A | 9/1988 | Griffin et al. |

(Continued)

FOREIGN PATENT DOCUMENTS

| JP | 57-176323 | 10/1982 |
| JP | 03-061622 | 3/1991 |

(Continued)

OTHER PUBLICATIONS

International Search Report dated May 16, 2017 in PCT/JP2017/005398 filed Feb. 15, 2017 (with English Translation).

(Continued)

*Primary Examiner* — William H Rodriguez
(74) *Attorney, Agent, or Firm* — Oblon, McClelland, Maier & Neustadt, L.L.P.

(57) ABSTRACT

A heat exhaust system for an on-aircraft electric generator, includes: a fuel pump which is driven by electric power generated by an electric generator installed in an aircraft, and which measures and supplies fuel to an engine of the aircraft; a first heat exchanger which releases heat generated by the electric generator into the fuel supplied to the engine; a fuel flow rate determiner which determines a flow rate of the fuel supplied to the engine by the fuel pump; an electric generator output determiner which determines an output from the electric generator; and a heat release controller which controls heat release at the first heat exchanger by using at least one of the flow rate of the fuel determined by the fuel flow rate determiner and the output determined by the electric generator output determiner as a control parameter.

8 Claims, 2 Drawing Sheets

(56) References Cited

U.S. PATENT DOCUMENTS

| | | | |
|---|---|---|---|
| 5,121,598 A * | 6/1992 | Butler | F02C 7/14 |
| | | | 60/39.08 |
| 5,152,146 A | 10/1992 | Butler | |
| 5,177,951 A * | 1/1993 | Butler | F02C 7/14 |
| | | | 60/772 |
| 5,241,814 A * | 9/1993 | Butler | F02C 7/14 |
| | | | 60/39.08 |
| 5,553,449 A | 9/1996 | Rodgers et al. | |
| 2010/0212857 A1 | 8/2010 | Bulin et al. | |
| 2011/0296846 A1 | 12/2011 | Aurousseau | |
| 2016/0167801 A1 | 6/2016 | Haskins et al. | |
| 2018/0187601 A1 * | 7/2018 | Segura Martinez De Ilarduya | F01D 25/20 |

FOREIGN PATENT DOCUMENTS

| | | |
|---|---|---|
| JP | 09-506952 | 7/1997 |
| JP | 2008-215184 | 9/2008 |
| JP | 2010-522842 | 7/2010 |
| JP | 2013-032707 | 2/2013 |
| JP | 2013-231406 | 11/2013 |
| JP | 5384670 | 1/2014 |
| JP | 2015-052315 | 3/2015 |

OTHER PUBLICATIONS

Written Opinion dated May 16, 2017 in PCT/JP2017/005398 filed Feb. 15, 2017.
Extended European Search Report dated Feb. 21, 2020 in European Patent Application No. 17845714.9, 6 pages.

* cited by examiner

HEAT EXHAUST SYSTEM FOR ON-AIRCRAFT ELECTRIC GENERATOR

CROSS REFERENCE TO RELATED APPLICATIONS

This application is a continuation application of International Application No. PCT/JP2017/005398, filed on Feb. 15, 2017, which claims priority to Japanese Patent Application No. 2016-170772, filed on Sep. 1, 2016. The contents of these applications are incorporated herein by reference in their entirety.

BACKGROUND

1. Technical Field

This disclosure relates to a heat exhaust system for an on-aircraft electric generator.

2. Description of the Related Art

An electric generator to generate electric power to be supplied to electric equipment is installed in an aircraft. The electric generator is driven by power transmitted from a gas turbine engine through an accessory gear box for driving auxiliary machines. The heat generating electric generator is cooled by engine oil, and the heat of the engine oil is released at a heat exchanger into fuel supplied from a fuel tank to the gas turbine engine, into air at an outlet of a fan of the gas turbine engine, and the like. Japanese Patent No. 5384670 discloses a technique related thereto.

Meanwhile, various equipment installed in aircraft have been converted to be electric in recent years. Such conversion can be observed, for example, in a fuel pump for supplying fuel from a fuel tank to a gas turbine engine. A general fuel pump is a gear pump that is driven by power transmitted from a gas turbine engine through an accessory gear box.

A flow rate of the fuel discharged from the gear pump depends on the number of revolutions of the gas turbine engine that supplies the power through the accessory gear box. As a consequence, there may be a case in which the gear pump discharges fuel in an amount exceeding that required by a combustor of the gas turbine engine, and the excess fuel has to be returned to an inlet of the gear pump, the fuel tank, and the like.

In this regard, the applicant of this disclosure has previously proposed a technique for enabling control of the number of revolutions of a gear pump without dependence on the number of revolutions of an engine but instead by rotating the gear pump with a dedicated electric motor. According to this proposal, by regulating the number of revolutions of the gear pump with the electric motor, it is possible to control the flow rate of the fuel to be discharged from the gear pump to an amount required for combustion by the combustor. Japanese Patent Application Publication No. 2013-231406 discloses the related technique.

SUMMARY

As the equipment installed in the aircraft including the above-mentioned gear pump are increasingly electrified, the aircraft will need to carry a large-size electric generator with a higher power generation capacity. An increase in size of the electric generator results in a larger amount of heat generation by the electric generator. Accordingly, an amount of heat to be released into the fuel, the air at the outlet of the fan, and the like by the intermediary of the engine oil is increased as well.

In the meantime, the fuel supplied to the gas turbine engine is on the decrease thanks to an improvement in fuel efficiency of the gas turbine engine. Reduction in fuel supply to the gas turbine engine decreases a thermal capacity per unit time of the supplied fuel that serves as a coolant. Accordingly, in view of further improvements in fuel efficiency of the gas turbine engines in the future, it will be difficult to count on the fuel supplied to the gas turbine engine to serve as a destination of heat release for the additional heat attributed to the larger amount of heat generation of the electric generator increased in size.

An object of this disclosure is to provide a heat exhaust system for an on-aircraft electric generator, which is capable of properly releasing heat generated by an electric generator installed in an aircraft.

An aspect of this disclosure provides a heat exhaust system for an on-aircraft electric generator, including: a fuel pump driven by electric power generated by an electric generator installed in an aircraft and configured to measure and supply fuel to an engine of the aircraft; a first heat exchanger configured to release heat generated by the electric generator into the fuel supplied to the engine; a fuel flow rate determiner configured to determine a flow rate of the fuel supplied to the engine by the fuel pump; an electric generator output determiner configured to determine an output from the electric generator; and a heat release controller configured to control heat release at the first heat exchanger by using at least one of the flow rate of the fuel determined by the fuel flow rate determiner and the output determined by the electric generator output determiner as a control parameter.

DESCRIPTION OF EMBODIMENTS

An embodiment of this disclosure will be described below with reference to a drawing.

Figure 1:
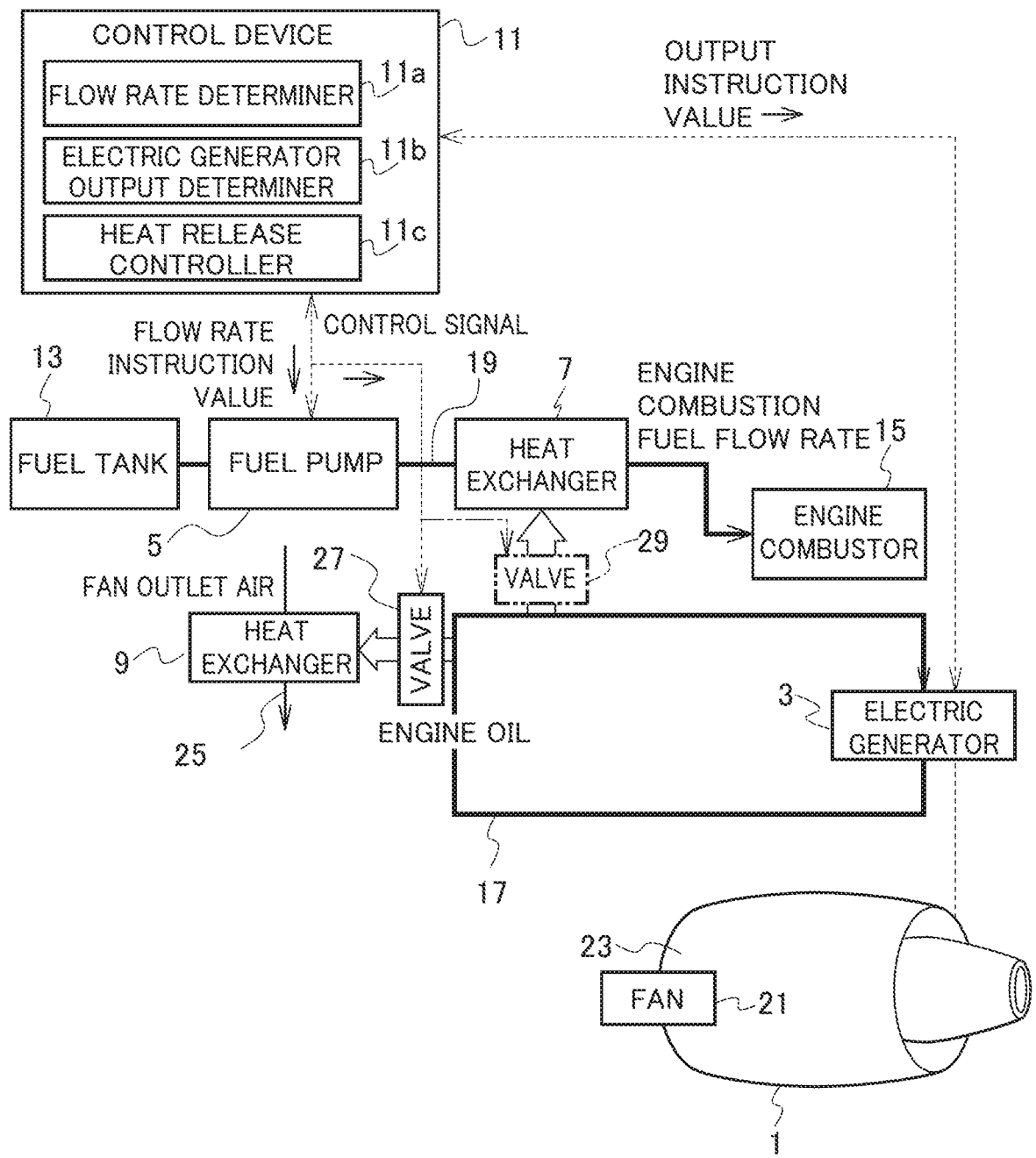
FIG. 1 is an explanatory diagram showing a heat exhaust system for an on-aircraft electric generator according to an embodiment of this disclosure.

A heat exhaust system of this embodiment shown in FIG. 1 is configured to release heat generated by an electric generator 3 that is installed in an aircraft and directly connected to a gas turbine engine 1 thereof. The heat exhaust system includes a fuel pump 5, two heat exchangers 7 and 9, and a control device 11.

The fuel pump 5 is a variable-flow electric metering pump which supplies fuel in a fuel tank 13 to an engine combustor 15 of the gas turbine engine 1. The fuel pump 5 can perform variable control of flow rate of the fuel supplied from the fuel tank 13 to the engine combustor 15 so as not to supply excess fuel that exceeds a flow rate required for combustion in the engine combustor 15.

Unlike the gear pump that has conventionally been used as a metering pump, the fuel pump 5 is driven by electric power generated by the electric generator 3. Specifically, the power to be transmitted from the gas turbine engine through the accessory gear box (AGB), which would serve as a power source for the conventional gear pump, is not used for driving the fuel pump 5.

The heat generated by the electric generator 3, which an engine oil for lubrication in the gas turbine engine 1 receives from the electric generator 3, is subjected to heat exchange by the two heat exchangers 7 and 9, and is released into a heat-receiving medium on a low-temperature side.

The heat exchanger 7 is provided on a fuel supply passage 19 extending from the fuel tank 13 to the engine combustor 15. The engine oil at a flow rate corresponding to an opening degree of a valve 29 flows in from a circulation passage 17 and passes through the heat exchanger 7. The heat exchanger 7 adopts the fuel to be combusted in the engine combustor 15 as the heat-receiving medium, and performs the heat exchange between the fuel and the engine oil in the circulation passage 17 that flows in through the valve 29.

Here, a portion of the fuel supply passage 19 from the fuel tank 13 to the heat exchanger 7 indicated with a dashed line corresponds to a portion of passage of the low-temperature fuel before the heat generated by the electric generator 3 is released from the engine oil in the circulation passage 17. Meanwhile, a portion of the fuel supply passage 19 from the heat exchanger 7 to the engine combustor 15 indicated with a solid line corresponds to a portion of passage of the high-temperature fuel after the heat generated by the electric generator 3 is released from the engine oil in the circulation passage 17.

On the other hand, the heat exchanger 9 is provided on a flow passage 25 where at least part of the air taken by a fan 21 at an inlet of the gas turbine engine 1 into an engine case 23 flows. The engine oil, at a flow rate corresponding to an opening degree of a valve 27, flows in from the circulation passage 17 and passes through the heat exchanger 9.

On a portion of the circulation passage 17 located upstream of the heat exchanger 7, in terms of a direction of circulation of the engine oil, the heat exchanger 9 adopts the air in the flow passage 25 as the heat-receiving medium, and performs the heat exchange between the air and the engine oil in the circulation passage 17, which flows in through the valve 27.

Here, a portion of the circulation passage 17 from the electric generator 3 to the heat exchanger 7, in terms of the direction of circulation of the engine oil which is indicated with a solid line, corresponds to a portion of passage of the high-temperature engine oil before releasing the heat generated by the electric generator 3. Meanwhile, a portion of the circulation passage 17 from the heat exchanger 7 to the electric generator 3, in terms of the direction of circulation of the engine oil which is indicated with a dashed line, corresponds to a portion of passage of the low-temperature engine oil after releasing the heat generated by the electric generator 3.

The control device 11 controls an output from the electric generator 3 based on an output instruction value and controls the flow rate of the fuel in the fuel tank 13, to be supplied to the engine combustor 15 with the fuel pump 5 based on a flow rate instruction value. The control device 11 may be an aircraft digital engine control device (FADEC: full authority digital engine control) for engine control that conducts control of the electric generator 3 at the same time. Alternatively, a combination of the FADEC device and a control device for the electric generator 3 may constitute the control device 11. In the following description, the control device 11 is assumed to be the FADEC device, which conducts the control of the electric generator 3 at the same time.

The control device 11 detects or determines the output from the electric generator 3 based on the output instruction value to be outputted to the electric generator 3, and detects or determines the flow rate of the fuel supplied from the fuel tank 13 to the engine combustor 15 based on the flow rate instruction value to be outputted to the fuel pump 5. Accordingly, the control device 11 functions as a fuel flow rate determiner 11$a$ and as an electric generator output determiner 11$b$.

Here, when the control device 11 outputs an instruction value on the number of revolutions of the pump to the fuel pump 5 instead of outputting the flow rate instruction value, the flow rate of the fuel supplied to the engine combustor 15 may be detected or determined by estimation from the instruction value on the number of revolutions of the pump or estimation from the actual number of revolutions of the pump measured at the fuel pump 5. Meanwhile, besides the estimation from the flow rate instruction value and the instruction value on the number of revolutions of the pump mentioned above, the flow rate of the fuel supplied from the fuel tank 13 to the engine combustor 15 may be detected or determined from measurement of the fuel flowing in the fuel supply passage 19 by using a sensor and the like. Besides the output instruction value mentioned above, the output from the electric generator 3 may be detected or determined, for example, from a measurement value by using a current sensor and the like.

The control device 11 also functions as a heat release controller 11$c$ that controls release of the heat generated by the electric generator 3 at the heat exchanger 7 and 9. There are three control patterns of heat release by the control device 11.

The first is a pattern in which the control device 11 controls a distribution ratio between an amount of heat to be released into the fuel supplied to the engine combustor 15 and an amount of heat to be released into the air taken by the fan 21 into the engine case 23, and flowing in the flow passage 25 by using one or both of the output from the electric generator 3 and the flow rate of the fuel supplied to the engine combustor 15 as a control parameter (or parameters). According to this pattern, the control device 11 adjusts the opening degree of the valve 27 such that the engine oil in the circulation passage 17 can release the amount of heat corresponding to the aforementioned distribution ratio into the air flowing in the flow passage 25, thereby controlling the flow rate of the engine oil flowing from the circulation passage 17 into the heat exchanger 9 at the flow rate in conformity to the aforementioned distribution ratio.

Here, the control device 11 may adjust the opening degree of the valve 29 such that the amount of heat corresponding to the aforementioned distribution ratio is released from the engine oil in the circulation passage 17 into the fuel flowing in the fuel supply passage 19, thereby controlling the flow rate of the engine oil flowing from the circulation passage 17 into the heat exchanger 7 at the flow rate in conformity to the aforementioned distribution ratio. Meanwhile, the control device 11 can also adjust the opening degrees of both of the valves 29 and 27, respectively, thereby controlling the flow rates of the engine oil flowing into both of the heat exchangers 7 and 9 at the flow rates in conformity to the aforementioned distribution ratio.

The second is a pattern in which the control device 11 controls the output instruction value to be outputted to the electric generator 3 by using the output from the electric generator 3 as a control parameter. According to this pattern, the output from the electric generator 3 is controlled at the output corresponding to the amount of heat generation in conformity to the thermal capacity of the fuel, so that all the heat generated by the electric generator 3 can be released into the fuel supplied to the engine combustor 15 by the fuel pump 5 at the flow rate detected or determined by the control device 11 based on the flow rate instruction value.

The third is a pattern in which the control device 11 controls the flow rate instruction value to be outputted to the fuel pump 5 by using the flow rate of the fuel supplied to the engine combustor 15 as a control parameter. According to this pattern, the flow rate of the fuel supplied to the engine combustor 15 by the fuel pump 5 is controlled at the flow rate corresponding to the thermal capacity in conformity to the amount of heat generation by the electric generator 3, so that all the heat generated by the electric generator 3 at the output detected or determined by the control device 11, based on the output instruction value, can be released into the fuel supplied to the engine combustor 15.

Note that the opening degree of the valve 27 may be added as a controlled object, and the flow rate of the engine oil to release the heat into the air in the flow passage 25 by the heat exchange at the heat exchanger 9 may also be controlled in the third control pattern. It is effective to carry out this control as appropriate in the case where all the heat generated by the electric generator 3 may not be successfully released into the fuel supplied to the engine combustor 15.

Here, a heat exhaust system for an on-aircraft electric generator, which supplies fuel to an engine combustor by using a gear pump, will be described with reference to an explanatory diagram of FIG. 2 for the purpose of comparison. In the heat exhaust system shown in FIG. 2, a fuel pump 33 being a constant-volume gear pump supplies the fuel from the fuel tank 13 to the engine combustor 15.

The fuel pump 33 is driven together with an electric generator 4 by an accessory gear box 2 (AGB) disposed in the vicinity of the engine case 23. Accordingly, the flow rate of the fuel discharged from the fuel pump 33 varies with a change in the number of revolutions of the AGB 2 that depends on the output from the gas turbine engine 1.

In this heat exhaust system, there may occur a case in which the fuel pump 33 discharges the excess fuel that exceeds the required flow rate for combustion in the engine combustor 15. When such a case occurs, the excess fuel is separated from the fuel to be supplied to the engine combustor 15 by a fuel control unit 35, and is returned to an inlet of the fuel pump 33 through a back-flow passage 37. In the meantime, part of the fuel in the back-flow passage 37 may also be returned to the fuel tank 13.

Figure 2:
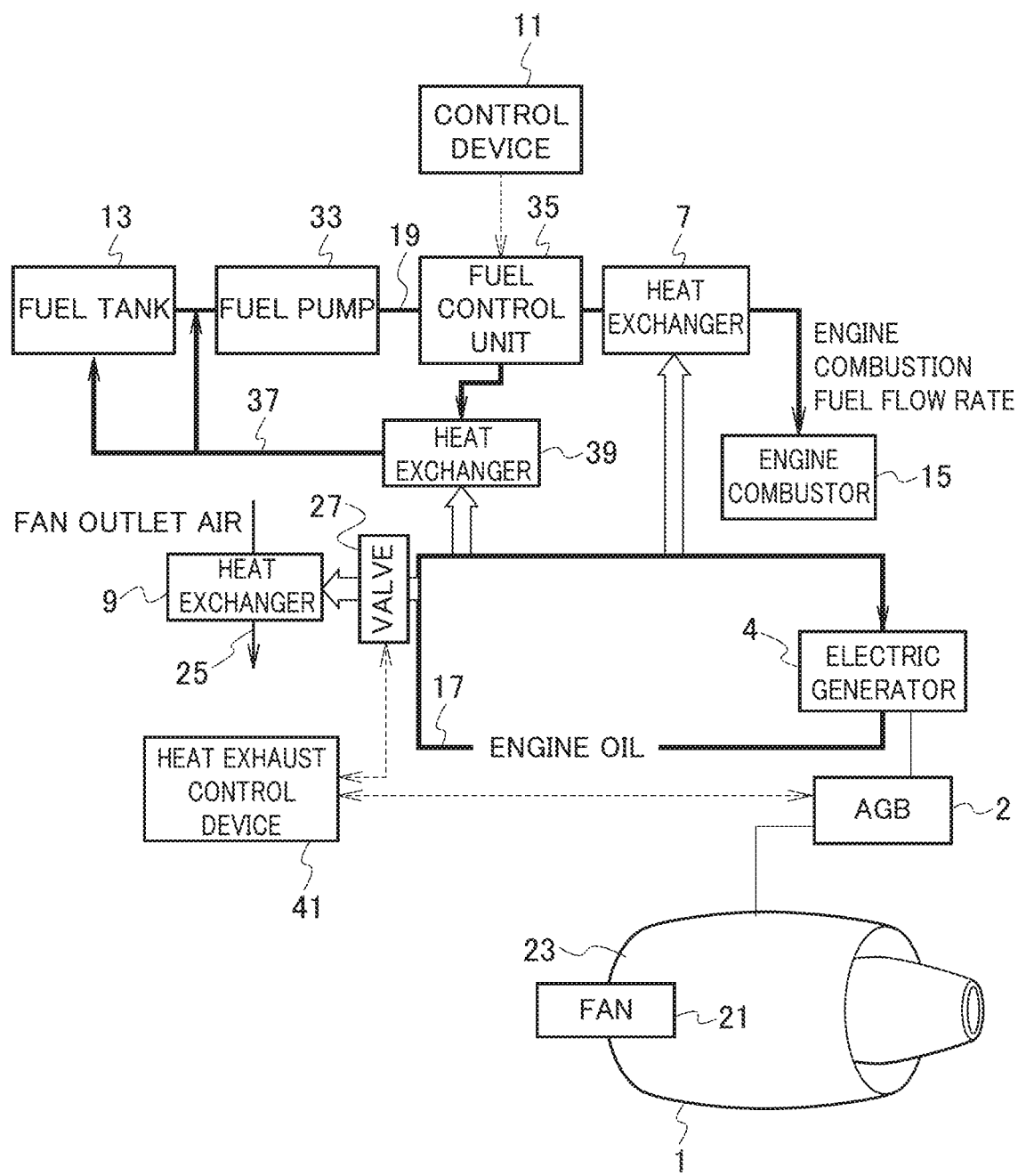
FIG. 2 is an explanatory diagram showing a heat exhaust system for an electric generator installed in an aircraft that supplies fuel to an engine combustor by using a gear pump.

Accordingly, in addition to the heat exchangers 7 and 9, a heat exchanger 39 provided on the back-flow passage 37 to return the excess fuel to the fuel tank 13 also releases the heat generated by the electric generator 4 from the engine oil into the fuel in the back-flow passage 37 in the heat exhaust system of FIG. 2.

However, in the heat exhaust system of FIG. 2, the excess fuel is flowed back to the fuel tank 13 or the inlet of the fuel pump 33. As a consequence, the fuel that is heated to a high temperature after passing through the fuel pump 33, being the gear pump, many times is supplied to the engine combustor 15. For this reason, the thermal capacity of the fuel flowing into the heat exchanger 7 is reduced, and the amount of heat release at the heat exchanger 7 is decreased. In order to make up for this decrease, it is necessary to increase the amount of heat release into the air in the flow passage 25 at the heat exchanger 9, or the amount of heat release into the excess fuel in the back-flow passage 37 at the heat exchanger 39.

Nonetheless, the increase in the amount of heat release into the air in the flow passage 25 is likely to cause reduction in air pressure at an outlet of the fan 21, or reduction in flow rate of the air at the outlet of the fan 21. Accordingly, there is a limit for increasing the amount of heat release at the heat exchanger 9. In the meantime, the heat release into the excess fuel in the back-flow passage 37 causes the high-temperature fuel to flow into the fuel tank 13, and may therefore be prohibited due to a safety reason when there is only a small amount of fuel left in the fuel tank 13, for instance.

From the above-mentioned circumstances, the heat exhaust system of FIG. 2, installed in the aircraft for supplying the fuel to the engine combustor 15 by using the fuel pump 33 being the gear pump, may potentially cause a failure to release all of the heat generated by the electric generator 4.

However, even if such a situation takes place, the control device 11 cannot grasp the amount of heat generation by the electric generator 4 from an operating condition of the electric generator 4 because a control system of the electric generator 4 is completely independent from the control device 11 or the FADEC device constituting the control device 11. As a consequence, a heat exhaust control device 41, which is different from the control device 11 that outputs the flow rate instruction value to the fuel control unit 35, will take on a role for detecting respective temperatures of the fuel supplied to the engine combustor 15 and of the engine oil in the circulation passage 17 to be involved in the heat exchange at the heat exchanger 7, and for controlling an opening action and/or the opening degree of the valve 27 based on the detected temperatures.

Therefore, the heat exhaust system of FIG. 2 has difficulty in conducting integrative and detailed control of the amount of heat generation by the electric generator 4 and the amounts of heat release at the respective heat exchangers 7 and 9.

On the other hand, according to the heat exhaust system of the embodiment shown in FIG. 1, a rise in temperature of the fuel supplied to the engine combustor 15 is alleviated by adopting the fuel to be combusted in the engine combustor 15 and/or the air at the outlet of the fan 21 as the heat-receiving media, and employing the fuel pump 5 that can control the flow rate of the fuel supplied to the engine combustor 15. Thus, it is possible to impart a larger thermal capacity to the fuel serving as the heat-receiving medium for the heat release. Meanwhile, the fuel used for the heat release is combusted in the engine combustor 15 without being flowed back to the fuel tank 13 and the like. In this regard, the rise in temperature of the fuel due to the heat release does not cause any problem.

For this reason, the heat exhaust system of the embodiment shown in FIG. 1 can properly release the heat generated by the electric generator 3 without the need to adopt the excess fuel as the heat-receiving medium, which is supposed to be returned from the fuel control unit 35 to the inlet of the fuel pump 33 or the fuel tank 13 through the back-flow passage 37 as in the heat exhaust system of FIG. 2.

Furthermore, it is not necessary to release all of the heat generated by the electric generator 3 into the air taken by the fan 21 and taken into the engine case 23. Accordingly, the heat exchanger 9 to be provided on the flow passage 25 to allow passage of the intake air does not have to be increased in size. For this reason, it is possible to avoid deterioration in output efficiency of the gas turbine engine 1, which would be caused by disposing the large heat exchanger 9 in the engine case 23.

Meanwhile, according to the heat exhaust system of this embodiment, the distribution ratio between the amount of heat to be released into the fuel supplied to the engine combustor 15, and the amount of heat to be released into the air taken by the fan 21 into the engine case 23 and flowing in the flow passage 25 is determined based on at least one of the output instruction value to the electric generator 3 corresponding to the amount of heat generation by the electric generator 3 and the flow rate instruction value to the fuel pump 5 corresponding to the thermal capacity of the fuel supplied to the engine combustor 15.

Then, the opening action and/or the opening degree of the valve 27 to adjust the amount of the engine oil to flow into the heat exchanger 9 on the flow passage 25 for the air taken by the fan 21 into the engine case 23 is decided by the distribution ratio thus determined.

On the other hand, the output instruction value to the electric generator 3 corresponding to the amount of heat generation by the electric generator 3 may be determined depending on the flow rate instruction value to the fuel pump 5 corresponding to the thermal capacity of the fuel supplied to the engine combustor 15, and details of the control involving the opening action and/or the opening degree of the valve 27 corresponding to the amount of heat release by the heat exchanger 9 may also be decided.

As a consequence, it is possible to conduct the control of the electric generator 3 based on the output of the output instruction value and the control of the opening action and/or the opening degree of the valve 27 of the heat exchanger 9 at the same time by the control device 11 that controls the fuel pump 5 based on the output of the flow rate instruction value. In this way, the configuration of the control system can be simplified, and an increase in burden owing to cooperation with other control devices can be thus prevented.

Here, among the above-described control patterns of heat release by the control device 11, the flow rate of the engine oil flowing in from the circulation passage 17 and passing through the heat exchanger 7 may be controlled by the control device 11 in accordance with the opening degree of the valve 29 in the third control pattern, which is designed for the control device 11 to control the flow rate instruction value to be outputted to the fuel pump 5 by using the flow rate of the fuel supplied to the engine combustor 15 as the control parameter.

In this case, the opening degrees of the valves 29 and 27 of the heat exchangers 7 and 9 may be controlled by the control device 11, respectively. By adjusting the opening degrees of the respective valves 29 and 27, it is possible to adjust the distribution ratio between the heat from the electric generator 3 to be released from the engine oil in the circulation passage 17 into the fuel supplied to the engine combustor 15 at the heat exchanger 7, and the heat from the electric generator 3 to be released from the engine oil in the circulation passage 17 into the air at the heat exchanger 9.

Meanwhile, among the control patterns of heat release by the control device 11, a measurement value obtained by directly measuring the output from the electric generator 3 may be fed back to the control device 11 so as to cause the control device 11 to control the output instruction value to be outputted to the electric generator 3 in the second pattern, which is designed for the control device 11 to control the output instruction value to be outputted to the electric generator 3 by using the output from the electric generator 3 as the control parameter.

As described above, the heat exhaust system for an on-aircraft electric generator according to the aspect of this disclosure includes: a fuel pump which is driven by electric power generated by an electric generator installed in an aircraft and is configured to measure and supply fuel to an engine of the aircraft; a first heat exchanger configured to release heat generated by the electric generator into the fuel supplied to the engine; a fuel flow rate determiner configured to determine a flow rate of the fuel supplied to the engine by the fuel pump; an electric generator output determiner configured to determine an output from the electric generator; and a heat release controller configured to control heat release at the first heat exchanger by using at least one of the flow rate of the fuel determined by the fuel flow rate determiner and the output determined by the electric generator output determiner as a control parameter.

In the above-described heat exhaust system, the fuel pump measures and supplies the fuel to the engine, and thus eliminates the possibility of discharging fuel in an amount exceeding the amount required by the engine combustor, as in the case of the gear pump driven by the gear box in the related art. For this reason, it is no longer necessary to return the excess fuel to the inlet of the gear pump or the fuel tank.

As a consequence, a situation in which the fuel supplied to the engine repeatedly passes through the gear pump and is thus heated to a high temperature due to the circulation of the excess fuel to the inlet of the gear pump or the fuel tank is less likely to occur. Thus, it is possible to impart a sufficient thermal capacity as the heat-receiving medium to the fuel that flows from the fuel pump into the first heat exchanger and is supplied to the engine.

Meanwhile, in the above-described heat exhaust system, the heat release controller controls the heat release at the first heat exchanger by using at least one of the flow rate of the fuel supplied to the engine which is determined by the fuel flow rate determiner and the output from the electric generator which is determined by the electric generator output determiner as the control parameter. Thus, it is possible to properly release the heat generated by the electric generator while striking a balance between the heat generation corresponding to the output from the electric generator and the thermal capacity corresponding to the flow rate of the fuel supplied to the engine without expectation of the heat release into the excess fuel to be returned to the fuel tank.

In the above-described heat exhaust system, a single control device may constitute the fuel flow rate determiner, the electric generator output determiner, and the heat release controller. Thus, it is possible to conduct integrative and detailed control of the amount of heat generation by the electric generator and/or the amounts of heat release by the respective heat exchangers.

Meanwhile, the heat release controller can also control the output from the electric generator by using the output determined by the electric generator output determiner as the control parameter.

Thus, it is possible to properly release the heat generated by the electric generator while controlling the output from the electric generator with the heat release controller such that the heat from the electric generator to be released at the first heat exchanger becomes equivalent to the thermal capacity of the fuel supplied to the engine.

Here, the heat release controller may control the flow rate of the fuel supplied to the engine by the electric metering pump by using the flow rate of the fuel determined by the fuel flow rate determiner as the control parameter.

In this case, the flow rate of the fuel supplied to the engine by the fuel pump can be controlled by the heat release controller such that the thermal capacity of the fuel supplied to the engine becomes equivalent to the heat from the electric generator to be released at the first heat exchanger. Thus, the heat generated by the electric generator can be properly released.

Meanwhile, the heat exhaust system may further include a second heat exchanger which releases the heat generated by the electric generator into air that is taken by a fan into a case of the engine, and the heat release controller may control heat release at the second heat exchanger.

Thus, it is possible to properly release the heat generated by the electric generator while arranging so that the heat from the electric generator is also released into the air taken by the fan into the case of the engine.

In the meantime, the heat exhaust system may further include a valve which adjusts an amount of introduction of the heat generated by the electric generator into any of the first and second heat exchangers. Here, the heat release controller may adjust an opening degree of this valve.

It is possible to properly release the heat generated by the electric generator by setting the amount of heat release into the fuel supplied to the engine and/or the air taken into the case of the engine to the amount equivalent to the heat from the electric generator to be released at the respective heat exchangers.

Although a certain embodiment of this disclosure has been described above, it is to be understood that this embodiment is merely an example. The technical scope of this disclosure is not limited only to the specific technical matters disclosed in the embodiment, but also encompasses various modifications, changes, alternative technologies, and so forth that can be easily derived therefrom.

A heat exhaust system, according to an aspect of this disclosure, is broadly applicable to aircraft equipped with an electric generator.

What is claimed is:

1. A heat exhaust system for an on-aircraft electric generator, comprising:
   a fuel pump driven by electric power generated by an electric generator installed in an aircraft, the fuel pump configured to measure and supply fuel to an engine of the aircraft;
   a first heat exchanger configured to release heat generated by the electric generator into the fuel supplied to the engine;
   a fuel flow rate determiner configured to determine a flow rate of the fuel supplied to the engine by the fuel pump;
   an electric generator output determiner configured to determine an output from the electric generator; and
   a heat release controller configured to control heat release at the first heat exchanger by using at least one of the flow rate of the fuel determined by the fuel flow rate determiner and the output determined by the electric generator output determiner as a control parameter.

2. The heat exhaust system for an on-aircraft electric generator according to claim 1, wherein a single control device constitutes the fuel flow rate determiner, the electric generator output determiner, and the heat release controller.

3. The heat exhaust system for an on-aircraft electric generator according to claim 1, wherein the heat release controller is configured to control the output from the electric generator by using the output determined by the electric generator output determiner as the control parameter.

4. The heat exhaust system for an on-aircraft electric generator according to claim 1, further comprising:
   a second heat exchanger configured to release the heat generated by the electric generator into air which is taken by a fan into a case of the engine, wherein
   the heat release controller is configured to control heat release at the second heat exchanger.

5. The heat exhaust system for an on-aircraft electric generator according to claim 4, further comprising:
   a valve configured to adjust an amount of introduction of the heat generated by the electric generator into the first heat exchanger or the second heat exchanger, wherein
   the heat release controller is configured to adjust an opening degree of the valve.

6. The heat exhaust system for an on-aircraft electric generator according to claim 2, wherein the heat release controller is configured to control the output from the electric generator by using the output determined by the electric generator output determiner as the control parameter.

7. The heat exhaust system for an on-aircraft electric generator according to claim 2, further comprising:
   a second heat exchanger configured to release the heat generated by the electric generator into air which is taken by a fan into a case of the engine, wherein
   the heat release controller is configured to control heat release at the second heat exchanger.

8. The heat exhaust system for an on-aircraft electric generator according to claim 7, further comprising:
   a valve configured to adjust an amount of introduction of the heat generated by the electric generator into the first heat exchanger or the second heat exchanger, wherein
   the heat release controller is configured to adjust an opening degree of the valve.

* * * * *